US008294569B2

(12) United States Patent
Thorn et al.

(10) Patent No.: US 8,294,569 B2
(45) Date of Patent: Oct. 23, 2012

(54) COMMUNICATION BETWEEN DEVICES BASED ON DEVICE-TO-DEVICE PHYSICAL CONTACT

(75) Inventors: Ola Karl Thorn, Malmo (SE); Darius Katz, Malmo (SE)

(73) Assignee: Sony Mobile Communications AB, Lund (SE)

( * ) Notice: Subject to any disclaimer, the term of this patent is extended or adjusted under 35 U.S.C. 154(b) by 560 days.

(21) Appl. No.: 12/463,895

(22) Filed: May 11, 2009

(65) Prior Publication Data
US 2009/0215397 A1    Aug. 27, 2009

Related U.S. Application Data

(63) Continuation-in-part of application No. 11/972,712, filed on Jan. 11, 2008.

(51) Int. Cl.
*G08B 1/08* (2006.01)
(52) U.S. Cl. ................... 340/539.11; 340/539.1
(58) Field of Classification Search ........... 340/539.1, 340/539.11, 539.21, 539.23, 500, 506, 612; 455/41.2, 414.2, 440, 456.1, 517; 343/700 MS, 343/841
See application file for complete search history.

(56) References Cited

U.S. PATENT DOCUMENTS

| | | | | |
|---|---|---|---|---|
| 5,337,066 | A * | 8/1994 | Hirata et al. .................. 343/841 |
| 7,620,404 | B2 * | 11/2009 | Chesnais et al. ........... 455/456.1 |
| 7,667,587 | B2 * | 2/2010 | Sato ............................. 340/500 |
| 2004/0192383 | A1 * | 9/2004 | Zacks et al. .................. 455/557 |
| 2004/0203381 | A1 * | 10/2004 | Cahn et al. .................... 455/41.2 |
| 2006/0256074 | A1 | 11/2006 | Krum et al. |
| 2007/0026797 | A1 * | 2/2007 | Borjeson et al. ............. 455/41.2 |
| 2007/0124503 | A1 * | 5/2007 | Ramos et al. ................. 709/248 |
| 2007/0188323 | A1 * | 8/2007 | Sinclair et al. ............ 340/568.1 |
| 2009/0215397 | A1 | 8/2009 | Thorn et al. |

FOREIGN PATENT DOCUMENTS

| | | |
|---|---|---|
| WO | WO 2004/062131 A1 | 7/2004 |
| WO | WO 2005/076542 A1 | 8/2005 |
| WO | WO 2007/034457 A1 | 3/2007 |
| WO | WO 2009-074887 A1 | 6/2009 |

OTHER PUBLICATIONS

Co-pending U.S. Appl. No. 11/972,712, filed Jan. 11, 2008 entitled "Interacting With Devices Based on Physical Device-To-Device Contact", Ola Karl Thorn.
Notification of Transmittal of the International Search Report and the Written Opinion for the International Searching Authority, or the Declaration, corresponding to PCT/IB2009/051936, mailed Jan. 25, 2010, 13 pages.
Notification of Transmittal of the International Search Report and the Written Opinion for the International Searching Authority, or the Declaration, corresponding to PCT/IB2008/051132, mailed Sep. 10, 2008, 12 pages.

\* cited by examiner

*Primary Examiner* — Van T. Trieu
(74) *Attorney, Agent, or Firm* — Patrick B. Horne; Moore & Van Allen PLLC

(57) ABSTRACT

A method includes detecting one or more physical contacts between the device and another device and determining whether the one or more physical contacts correspond to one or more taps. The method further includes initiating a discovery request to the other device, when it is determined that the physical contact corresponds to the one or more taps, and communicating to the other device when a communication link is established between the device and the other device based on the discovery request.

20 Claims, 7 Drawing Sheets

COMMUNICATION BETWEEN DEVICES BASED ON DEVICE-TO-DEVICE PHYSICAL CONTACT

RELATED APPLICATIONS

This application is a continuation-in-part (CIP) of U.S. patent application Ser. No. 11/972,712, filed Jan. 11, 2008, entitled "INTERACTING WITH DEVICES BASED ON PHYSICAL DEVICE-TO-DEVICE CONTACT,", which further claims priority from U.S. provisional application No. 61/013,180, filed Dec. 12, 2007, the disclosures of both of which are incorporated by reference herein in their entireties.

BACKGROUND

Many computer or communication devices rely on a keyboard or a keypad to provide part of a user interface. However, using the keyboard or keypad is often cumbersome and/or inconvenient. In addition, other devices that use touch screens to emulate a keyboard or a keypad may not provide significant improvements over devices that use a keyboard or a keypad.

SUMMARY

According to one aspect, a method may detecting, by a device, one or more physical contacts between the device and another device; determining, by the device, whether the one or more physical contacts corresponds to one or more taps; initiating, by the device, a discovery request to the other device, when it is determined that the physical contact corresponds to the one or more taps; and communicating, by the device, to the other device when a communication link is established between the device and the other device based on the discovery request.

Additionally, the method may include receiving, by the device, a discovery response from the other device.

Additionally, the initiating may include transmitting, by the device, the discovery request at a power level that permits the other device to receive the discovery request only if the other device is at a distance of two meters or less from the device.

Additionally, the determining may include determining, by the device, whether a tapping pattern exists based on one or more of a number of the one or more physical contacts detected, a location in which the one or more physical contacts occurred, a force associated with the one or more physical contacts, or a time duration in which the one or more physical contacts occurred.

Additionally, the communicating may include transmitting, by the device, data to the other device.

Additionally, the transmitting may include selecting, by the device, the file to transmit based on a file in which the device is currently utilizing.

Additionally, the communicating may include coordinating, by the device, at least one of an audio task or a visual task with the other device.

Additionally, where the coordinating may include identifying, by the device, a particular audio task or a particular visual task based on a tapping pattern associated with the one or more taps.

According to another aspect, a user device may be configured to monitor for an occurrence of one or more device-to-device physical contacts associated with the user device and another device; determine whether one or more taps occurred based on the occurrence of the one or more device-to-device physical contacts; establish a communication link with the other device, when it is determined that one or more taps occurred; and communicate with the other device once the communication link is established.

Additionally, the user device may further configured to determine whether the one or more taps correspond to a tapping pattern; and where, when communicating, the user device may be configured to perform at least one of an audio task or a visual task in correspondence to the tapping pattern, when it is determined that the one or more taps correspond to the tapping pattern.

Additionally, the user device may include a wireless communication device.

Additionally, the when determining whether one or more taps occurred, the user device may be configured to identify at least one of a number of the one or more device-to-device physical contacts, a force associated with each of the one or more device-to-device physical contacts, a direction associated with each of the one or more device-to-device physical contacts, or a time duration between one of the one or more device-to-device physical contacts and a subsequent one of the one or more device-to-device physical contacts.

Additionally, when establishing the communication link, the user device may be configured to regulate a transmission power associated with a discovery phase so that the other device to receive a discovery request is capable of responding only if the other device is at a distance of two meters or less from the user device.

Additionally, when establishing the communication link, the user device may be configured to initiate a dialogue with the other device to inform the other device of a task to which the other device is to perform once the communication link is established.

Additionally, when communicating, the user device may be configured to transmit data in which the user device is utilizing, where the data includes one of audio data, video data, image data, or text.

Additionally, when communicating, the user device may be configured to utilize Bluetooth profiles.

According to still another aspect, a computer-readable medium may contain instructions executable by at least one processor. The computer-readable medium may store instructions for determining whether a device has been tapped based on sensor information; initiating a discovery phase to locate another device to which the device was tapped, when it is determined that the device has been tapped; and communicating with the other device when the other device is located.

Additionally, the computer-readable medium may reside on a portable device.

Additionally, the instructions for communicating may include one or more instructions for interacting with the other device, where the interacting includes transmitting data to the other device.

BRIEF DESCRIPTION OF THE DRAWINGS

The accompanying drawings, which are incorporated in and constitute a part of this specification, illustrate one or more exemplary embodiments described herein and, together with the description, explain these exemplary embodiments. In the drawings.

DETAILED DESCRIPTION

The following detailed description refers to the accompanying drawings. The same reference numbers in different drawings may identify the same or similar elements. Also, the following description does not limit the invention.

The term "tap," "knock," and "touch," as used herein, is intended to be broadly interpreted to include a contact or impact between two or more devices. The impact may cause sufficient change in momentum to allow a sensor, such as an accelerometer, to detect the change. Alternatively, the contact may cause a sensor, such as an electric field sensor, a surface conduction sensor, a pressure/force sensor, etc., to detect a surface contact against another surface. However, it will be appreciated that not all physical contacts constitute a tap. As will be described in greater detail below, a tap may include other parameters (e.g., number of physical contacts, location, etc.).

The term "tap pattern," as used herein, is intended to be broadly interpreted to include the number of taps, a time duration between a tap and a subsequent tap, a location and/or a direction of a tap with respect to a device, a force associated with a tap, and/or an orientation of a device when the tap occurred. By way of example, a tap pattern may correspond to two or more taps occurring in a relatively short period of time (e.g., one second or less, two seconds or less, three seconds or less).

Overview

Embodiments described herein relate to communication between devices based on device-to-device physical contact. A device may establish a communication link with another device after a user taps the device against the other device. When the user taps the device against the other device, the device may detect the taps and initiate a discovery phase to detect the (nearby) other device. In one embodiment, the device and other device may have a master/slave relationship. In other embodiments, the device and other device may have a peer-to-peer relationship. When the other device is detected, a communication link may be established. Thereafter, the device may communicate and/or interact with the other device. For example, the device may send data to the other device.

Figure 1A:
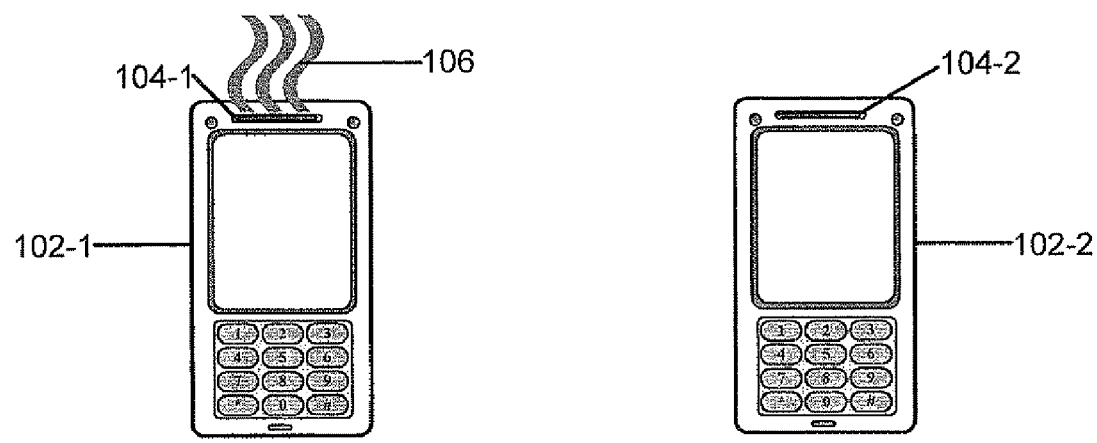
FIGS. 1A-1C are diagrams illustrating an overview of an exemplary embodiment described herein.
Figure 1B:
Figure 1C:
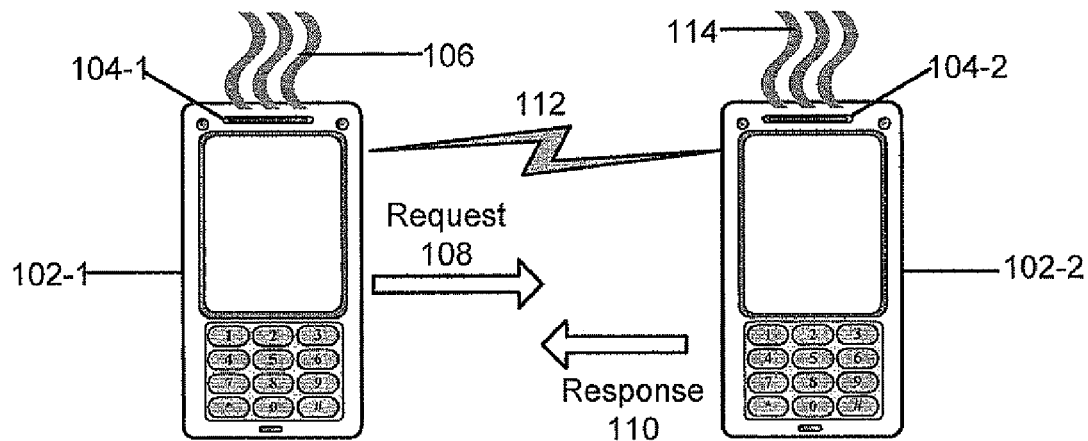

FIGS. 1A-1C are diagrams illustrating an overview of an exemplary embodiment described herein. FIGS. 1A-1C illustrate devices 102-1 and 102-2 (e.g., wireless telephones). Device 102-1 and device 102-2 may include speaker 104-1 and 104-2, respectively. Assume that device 102-1 is playing music and generating sound waves 106 via speaker 104-1. As illustrated in FIG. 1B, a user may tap device 102-1 into device 102-2, or vice versa. When a user taps device 102-1 and device 102-2 together, device 102-1 may sense the taps. In one embodiment, device 102-2 may not need to sense the taps. As illustrated in FIG. 1C, upon device 102-1 sensing the taps, device 102-1 may initiate a discovery phase. For example, a discovery request 108 may be sent from device 102-1. In one embodiment, to minimize the probability of discovering a device, other than device 102-2, discovery request 108 may be transmitted so it may be received by devices only within close proximity (e.g., two meters or less, one meter or less, or a half meter or less) of device 102-1. In other embodiments, discovery request 108 may be transmitted according to a user-configured distance. It is assumed that device 102-2 is in close proximity of device 102-1 and receives discovery request 108.

In response to discovery request 108, device 102-2 may send a discovery response 110. Thereafter, devices 102-1 and 102-2 may establish a communication link 112. Once communication link 112 is established, the close proximity of distance between device 102-1 and device 102-2 may not be necessary. Rather, devices 102-1 and 102-2 may freely separate in accordance with the transmission range of communication link 112. Through communication link 112, device 102-1 may transmit signals associated with the music. Consequently, speakers 104-2 of device 102-2 may output sound waves 114.

As a result of the foregoing, the user may have devices that communicate/interact with one another over a communication link based on taps. The communication/interaction between devices may be convenient (e.g., no need to navigate through a menu system to communicate/interact with another device), safe (e.g., may avoid spam, viruses, and/or other unwanted network data), and economical (e.g., no need to expend energy on having a communication link until taps are detected). The exemplary embodiment has been broadly described with respect to FIGS. 1A-1C. Accordingly, a detailed description and variations to this embodiment are provided below.

Exemplary Device

Figure 2:
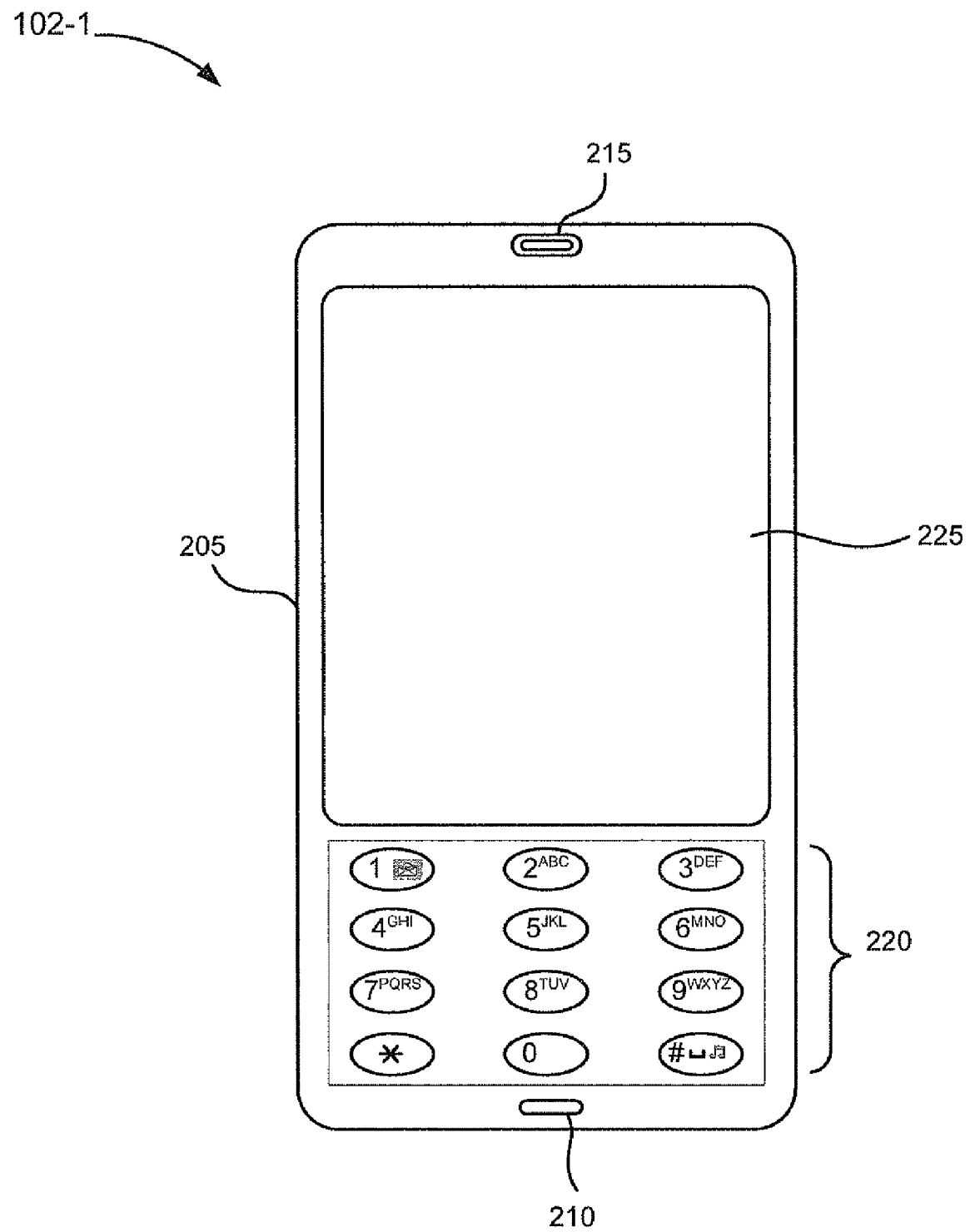
FIG. 2 is a diagram illustrating an exemplary device in which the embodiments described herein may be implemented.

FIG. 2 is a diagram of an exemplary device 102-1. The term "device," as used herein, is intended to be broadly interpreted to include a variety of devices. For example, device 102-1 may include a portable device, a mobile device, a handheld device, or a stationary device, such as a wireless telephone (e.g., a smart phone or a cellular phone), a personal digital assistant (PDA), a pervasive computing device, a computer (e.g., a desktop computer, a laptop computer, a palmtop computer), a music playing device, a multimedia playing device, a television (e.g., with a set top box and/or remote control), a navigation device (e.g., Global Positioning System (GPS) device), a copier, a fax machine, a printer, a wearable computing device (e.g., a watch, a headset), a vehicle-based device, or some other type of user device (a kiosk device). Device 102-2 may correspond to device 102-1 or some other type of device having communication capability and/or an ability to receive information from device 102-1.

As illustrated in FIG. 2, device 102-1 may include a housing 205, a microphone 210, a speaker 215, a keypad 220, and a display 225. In other embodiments, device 102-1 may include fewer, additional, and/or different components, or a different arrangement of components than those illustrated in FIG. 2 and described herein. For example, device 102-1 may include a camera, a video capturing component, and/or a flash for capturing images and/or video. Additionally, or alternatively, device 102-1 may not include speakers 215 or display 225.

Housing 205 may include a structure to contain components of device 102-1. For example, housing 205 may be formed from plastic, metal, or some other material. Housing 205 may support microphone 210, speaker 215, keypad 220, and display 225.

Microphone 210 may transduce a sound wave to a corresponding electrical signal. For example, the user may speak into microphone 210 during a telephone call or to execute a voice command. Speaker 215 may transduce an electrical signal to a corresponding sound wave. For example, the user may listen to music or listen to a calling party through speaker 215.

Keypad 220 may provide input to device 102-1. Keypad 220 may include a standard telephone keypad, a QWERTY keypad, and/or some other type of keypad or input component. Keypad 220 may also include one or more special purpose keys. In one implementation, each key of keypad 220 may be, for example, a pushbutton. The user may utilize keypad 220 for entering information, such as text, or for activating a special function.

Display 225 may output visual content and may operate as an input component (e.g., a touch screen). For example, display 225 may include a liquid crystal display (LCD), a plasma display panel (PDP), a field emission display (FED), a thin film transistor (TFT) display, or some other type of display technology. Display 225 may display, for example, text, images, and/or video to a user.

In one implementation, display 225 may include a touch-sensitive screen. Display 225 may correspond to a single-point input device (e.g., capable of sensing a single touch) or a multipoint input device (e.g., capable of sensing multiple touches that occur at the same time). Display 225 may implement, for example, a variety of sensing technologies, including but not limited to, capacitive sensing, surface acoustic wave sensing, resistive sensing, optical sensing, pressure sensing, infrared sensing, gesture sensing, etc. Display 225 may display various images (e.g., icons, a keypad, etc.) that may be selected by a user to access various applications and/or enter data. Display 225 may also include an auto-rotating function (e.g., display images based on the orientation of device 102-1 (i.e., display 225). Display 225 may serve as a viewfinder when device 102-1 includes a camera or a video capturing component.

Figure 3:
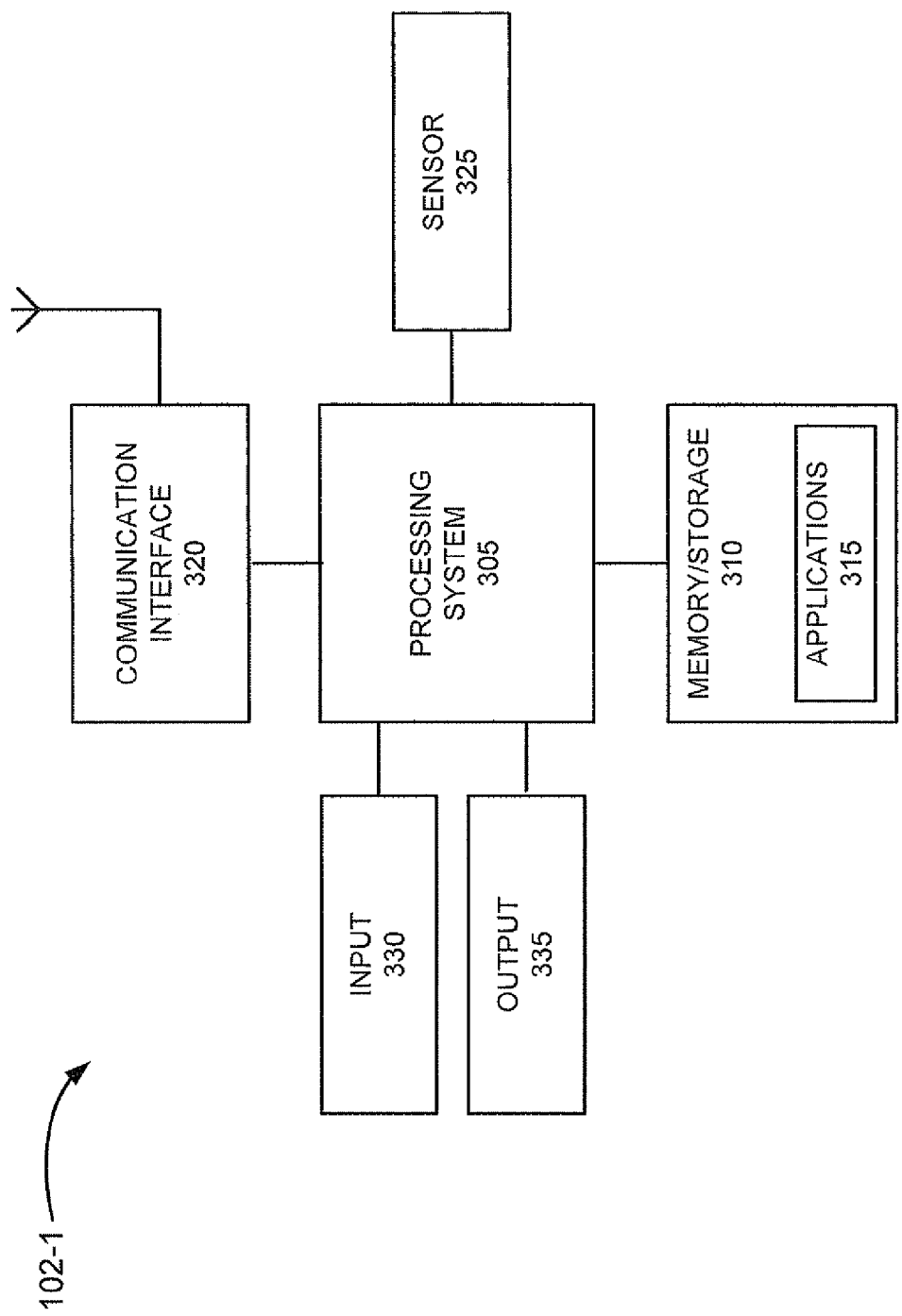
FIG. 3 is a diagram illustrating exemplary components of the device depicted in FIGS. 1 and 2.

FIG. 3 is a diagram illustrating exemplary components of device 102-1. As illustrated, device 102-1 may include a processing system 305, a memory/storage 310 (e.g., containing applications 315), a communication interface 320, a sensor 325, an input 330, and an output 335. In other embodiments, device 102-1 may include fewer, additional, and/or different components, or a different arrangement of components than those illustrated in FIG. 3 and described herein.

Processing system 305 may include one or more processors, microprocessors, data processors, co-processors, network processors, application specific integrated circuits (ASICs), controllers, programmable logic devices, chipsets, field programmable gate arrays (FPGAs), and/or some other component(s) that may interpret and/or execute instructions and/or data. Processing system 305 may control the overall operation (or a portion thereof) of device 102-1 based on an operating system and/or various applications.

Processing system 305 may access instructions from memory/storage 310, from other components of device 102-1, and/or from a source external to device 102-1 (e.g., a network or another device). Processing system 305 may provide for different operational modes associated with device 102-1. Additionally, processing system 305 may operate in multiple operational modes simultaneously. For example, processing system 305 may operate in a camera mode, a music playing mode, a radio mode (e.g., an amplitude modulation/frequency modulation (AM/FM) mode), and/or a telephone mode.

Memory/storage 310 may include memory and/or secondary storage. For example, memory/storage 310 may include a random access memory (RAM), a dynamic random access memory (DRAM), a read only memory (ROM), a programmable read only memory (PROM), a flash memory, and/or some other type of memory. Memory/storage 310 may include a hard disk (e.g., a magnetic disk, an optical disk, a magneto-optic disk, a solid state disk, etc.) or some other type of computer-readable medium, along with a corresponding drive. The term "computer-readable medium," as used herein, is intended to be broadly interpreted to include a memory, a secondary storage, a compact disc (CD), a digital versatile disc (DVD), or the like. For example, a computer-readable medium may be defined as a physical or logical memory device. A logical memory device may include memory space within a single physical memory device or distributed across multiple physical memory devices.

Memory/storage 310 may store data, application(s), and/or instructions related to the operation of device 102-1. For example, memory/storage 310 may include a variety of applications 315, such as, an e-mail application, a telephone application, a camera application, a voice recognition application, a video application, a multi-media application, a music player application, a visual voicemail application, a contacts application, a data organizer application, a calendar application, an instant messaging application, a texting application, a web browsing application, a location-based application (e.g., a GPS-based application), a blogging application, and/or other types of applications (e.g., a word processing application, a spreadsheet application, etc.).

Communication interface 320 may permit device 102-1 to communicate with other devices, networks, and/or systems. For example, communication interface 320 may include an Ethernet interface, a radio interface, a microwave interface, or some other type of wireless and/or wired interface. Communication interface 320 may include a transmitter and a receiver. Communication interface 320 may include a GPS receiver or a Beidou Navigation System (BNS) receiver. Communication interface 320 may support various wireless and/or wired protocols and standards. For example, communication interface 320 may support Ultra WideBand (UWB) communication, Bluetooth, Wireless Fidelity (Wi-Fi), Transport Control Protocol/Internet Protocol (TCP/IP), Institute of Electrical and Electronics Engineers (IEEE) 802.X, Wireless Application Protocol (WAP), or any other type of wireless and/or wired protocol or standard.

Sensor 325 may permit device 102-1 to detect device-to-device physical contact. Sensor 325 may detect the number of physical contacts, the location and/or direction of each physical contact, a time duration between a physical contact and a subsequent physical contact, and/or a force associated with the physical contact. In one embodiment, sensor 325 may detect the location and/or direction of a physical contact regardless where it occurs with respect to device 102-1. In another embodiment, sensor 325 may detect the location and/or direction of a physical contact only when it occurs in one or more specific areas of device 102-1.

Sensor 325 may include, for example, an accelerometer and/or a contact-sensitive sensor (e.g., an electric field sensor, a surface conduction sensor, a pressure/force sensor, a vibration sensitive sensor, etc.) to detect a physical contact.

The accelerometer may include hardware or a combination of hardware and software for determining an acceleration of device 102-1. The accelerometer may include, for example, a micro electro mechanical system (MEMS) accelerometer, a piezoelectric accelerometer, or some other type of accelerometer. The accelerometer may be coupled to housing 205 of device 102-1 for measuring acceleration in one, two, or three axes. For example, when the accelerometer detects acceleration, the accelerometer may output its measurement(s), each of which may represent the magnitude of an acceleration that corresponds to one of the coordinate axes. In such an implementation, the output(s) of the accelerometer may be used to determine a tap on the surface of housing 205 of device 102-1.

The contact-sensitive sensor may include hardware or a combination of hardware and software for determining a physical contact. The contact-sensitive sensor may include, for example, an electric field sensor, a surface conduction sensor, a pressure/force sensor, a vibration sensitive sensor, etc. The contact-sensitive sensor may determine a location of a nearby device and/or a touching device having a conductive surface. The electric field/surface conduction sensor may generate an electric field or a current at the surface of housing 205, and may detect changes in its capacitance, electric field, and/or impedance of current paths when the device is close to or is in contact with device 102-1.

Sensor 325 may include other types of sensors, such as, for example, a gyroscope or a magnetometer to obtain an orientation of device 102-1. Sensor 325 may correspond to a camera that is capable of detecting motion or even a microphone to detect sound associated with physical contacts or taps.

Input 330 may permit a user and/or another device to input information to device 102-1. For example, input 330 may include a keyboard, microphone 210, keypad 220, display 225, a touchpad, a mouse, a button, a switch, an input port, voice recognition logic, fingerprint recognition logic, retinal scan logic, a web cam, and/or some other type of visual, auditory, tactile, etc., input component. Output 335 may permit device 102-1 to output information to a user and/or another device. For example, output 335 may include speaker 215, display 225, one or more light emitting diodes (LEDs), an output port, a vibrator, and/or some other type of visual, auditory, tactile, etc., output component.

Figure 4:
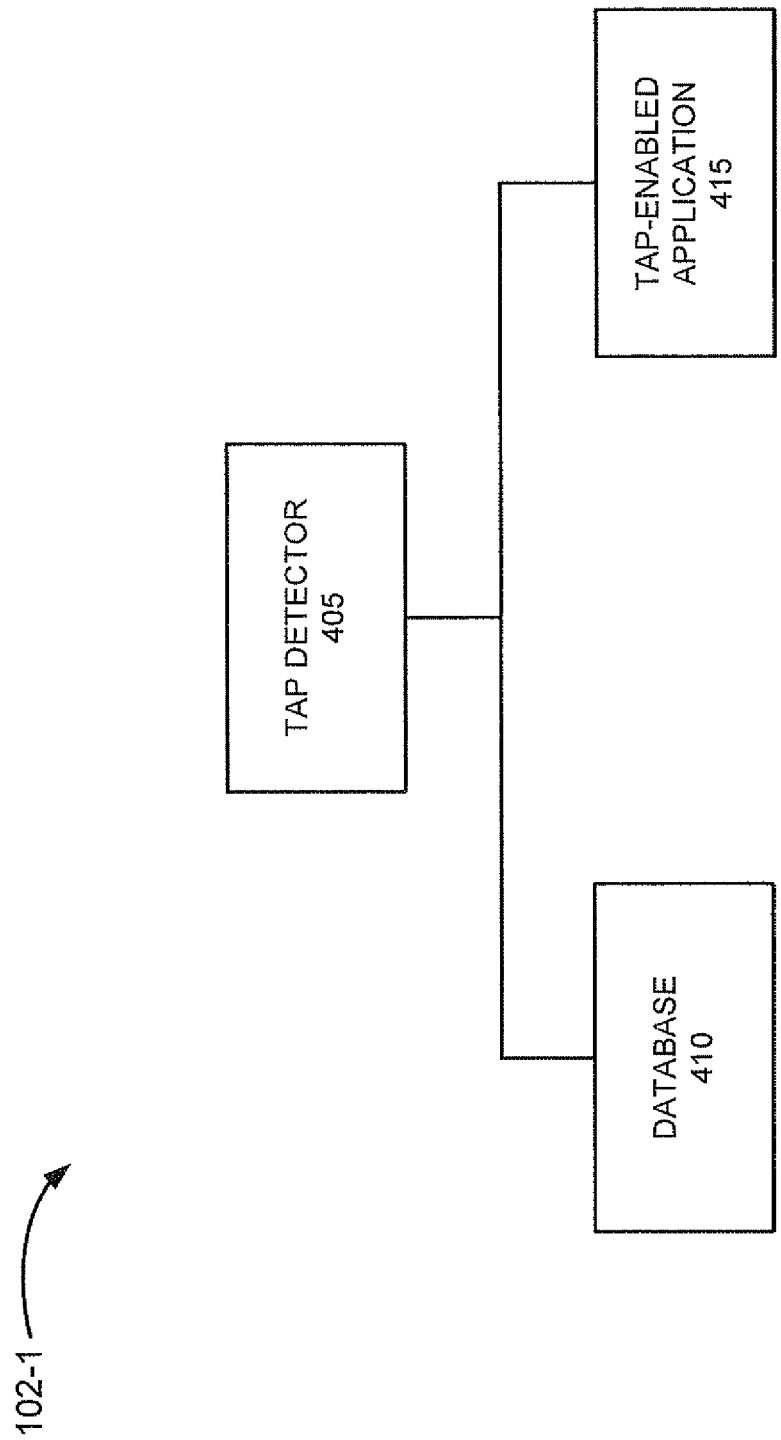
FIG. 4 is a diagram illustrating exemplary functional components associated with the device depicted in FIGS. 1-3.

FIG. 4 is a diagram of exemplary functional components associated with device 102-1. As illustrated, device 102-1 may include a tap detector 405, a database 410, and a tap-enabled application 415. Tap detector 405, database 410, and tap-enabled application 415 may be implemented in hardware (e.g., processing system 305, memory/storage 310, etc.) or a combination of hardware and software (e.g., applications 315), respectively.

Tap detector 405 may detect a particular tap pattern based on input from sensor 325. For example, tap detector 405 may receive or retrieve physical contact information from sensor 325. Tap detector 405 may compare the physical contact information with stored tap patterns in database 410. If tap detector 405 finds a match, tap detector 405 may have knowledge that a tap pattern has been detected by sensor 325. Tap detector 405 may output that a tap pattern has been detected to tap-enabled application 415. In one embodiment, tap detector 405 may not determine that a tap pattern exists unless sensor 325 detects at least two physical contacts. In another embodiment, tap detector 405 may determine that a tap pattern exists even when sensor 325 detects a single physical contact. However, it will be appreciated that when the physical contact corresponds to a single tap, such an implementation may be susceptible to false positives (e.g., an accidental bump of device 102-1). Nevertheless, other tap pattern information, such as, for example, the location and/or direction in which the tap occurred, the force associated with the tap, the number of taps, etc., may be utilized to distinguish a tap from an accidental bump of device 102-1 or some other type of false positive.

Database 410 may store information related to tap patterns. For example, database 410 may store tap pattern information that may be used to identify a tap pattern based on physical contact information detected by sensor 325. The tap pattern information may include for example, a number of taps, a time duration between a tap and a subsequent tap, a location and/or a direction of a tap (e.g., on the top of device 102-1, on the side of device 102-1, etc.) with respect to a device, a force associated with a tap, and/or an orientation of a device when the tap occurred. Additionally, tap pattern information may include information related to the meaning of the tap pattern. For example, a tap pattern may be associated with sharing music, while another tap pattern may be associated with sharing a picture. In this regard, a tap pattern may be associated with a specific application 315, function (e.g., file sharing, file transfer, etc.), and/or some other type of interaction between device 102-1 and other device 102-2, as will be described further below.

Tap-enabled application 415 may establish communication with other device 102-2. For example, tap-enabled application may receive an output from tap detector 405 that indicates a tap pattern has been detection. Tap-enabled application 415 may initiate a communication, with other device 102-2 with which device 102-1 has been tapped, via communication interface 320. For example, tap-enabled application 415 may initiate a discovery phase to locate other device 102-2 and establish a communication link with other device 102-2. In one embodiment, tap-enabled application 415 may transmit a discovery request (e.g., discovery request 108). When a discovery response (e.g., discovery response 110) is received from other device 102-2, tap-enabled application 415 may establish a communication link (e.g., communication link 112). In instances when a discovery response is not received after a certain period of time, tap-enabled application 415 may cease the discovery phase. Alternatively, tap-enabled application may automatically utilize a different standard or protocol to fulfill the discovery phase. It is recognized that some protocols, such as, for example, Bluetooth, include profiles to perform different operations. For example, basic imaging profiles (BIPs) relate to sending images between devices, basic printing profiles (BPP) relate to sending information to printers, and file transfer profiles (FTP) relate to browsing, manipulating, and transferring objects (e.g., files and folders). In one embodiment, the selection of the standard or protocol may be based on the execution phase, as described below.

As previously described, tap-enabled application 415 may establish a communication link with other device 102-2 when the discovery phase is completed. Tap-enabled application 415 may initiate a dialogue with other device 102-2 so that an execution phase of the communication may begin. For example, the execution phase of the communication may correspond to transferring information to other device 102-2 or some other type of interaction with other device 102-2. In one embodiment, tap-enabled application 415 may select the appropriate action to be taken based on the tap pattern information (e.g., information related to the meaning of the tap pattern). In another embodiment, tap-enabled application 415 may select the appropriate action associated with the execution phase based on a context-dependent scheme. For example, when device 102-1 is playing music or playing a video, the file associated with the music or video may be sent to other device 102-2. Thus, tap-enabled application 415 may determine what to do based on a current state (e.g., applications 315 being utilized, windows or folders opened, etc.) of device 102-1.

Examples of different types of execution phases may include transferring a piece of information (e.g., an electronic payment, a coupon, contact information, an image, music, text, a video, etc.) between device 102-1 and other device 102-2; sharing a task (e.g., outputting stereo audio signal to different speakers on different devices) between device 102-1 and other device 102-2; selecting other device 102-2 as an input/output device (e.g., a wireless display or keyboard), etc. In one embodiment, when tap-enabled application 415 is implemented to share data (e.g., a picture, a video, music, text, a web document, or other media content), tap-enabled application 415 may determine how to layout (e.g., distribute or arrange) the data across multiple displays associated with device 102-1 and other device 102-2. Additionally, the transference or sharing of information may not necessarily relate to information stored in device 102-1. Rather, the information may relate to information received from another device or network external from device 102-1. For example, device 102-1 may be connected to a network (e.g., the Internet) and receiving streaming information (e.g., a video). Device 102-1 may share the streaming information with other device 102-2.

Although FIG. 4 illustrates exemplary functional components, in other embodiments, device 102-1 may include additional, fewer, or different functional components than those illustrated in FIG. 4 and described herein. For example, in other embodiments, database 410 may be omitted, where the number of taps and/or an association of tap patterns with the execution phase (e.g., transfer a file, interact with the other device 102-2) may not be needed. In such an embodiment, the number of taps may be irrelevant provided device 102-1 (e.g., sensor 325) recognizes an invocation to begin the discovery phase and subsequent communication with other device 102-2. In such instances, once communication is established between device 102-1 and other device 102-2, the execution phase may be context-dependent. For example, as previously described, when device 102-1 is playing music or playing a video, the file associated with the music or video may be sent to other device 102-2.

Additionally, or alternatively, in other implementations, device 102-1 may include a different arrangement of components than the arrangement illustrated in FIG. 4 and described herein. For example, the functionalities of tap detector 405 may be incorporated with tap-enabled application 415. Additionally, other device 102-2 may not include the exemplary functional components depicted in FIG. 4, since device 102-2 may not need to detect a tap pattern. Additionally, device 102-2 may not include sensor 325.

Exemplary Process

Figure 5:
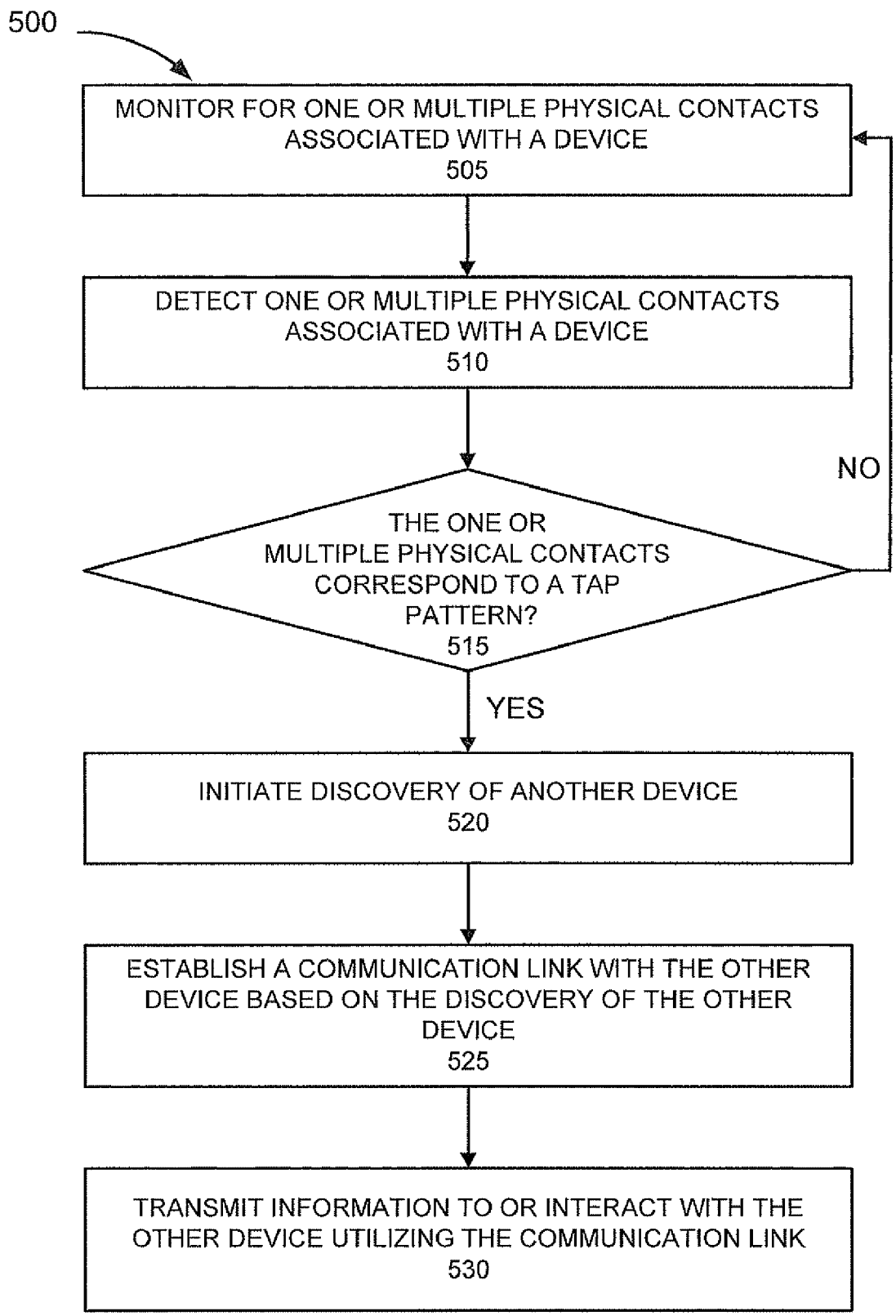
FIG. 5 is a flow diagram illustrating an exemplary process for controlling audio settings based on window settings.

FIG. 5 is a flow diagram illustrating an exemplary process 500 for establishing communication and communicating based on device-to-device physical contact. Components of device 102-1 described as performing a particular operation of process 500, may, in other implementations, be performed by other components of device 102-1, or may be performed in combination with other components of device 102-1.

Process 500 may begin with monitoring for one or multiple physical contacts associated with a device (block 505). In one embodiment, sensor 325 may continuously monitor for one or multiple physical contacts. In another embodiment, sensor 325 may be activated to monitor for one or multiple physical contacts based on a user input received by input 330. For example, a user may activate sensor 325 by pressing a button on keypad 220 or some other type of user input.

One or multiple physical contacts associated with the device may be detected (block 510). For example, as previously described, a user of device 102-1 may cause one or multiple physical contacts with other device 102-1 (or vice versa). Sensor 325 may detect one or multiple physical contacts associated with device 102-1.

It may be determined whether the one or multiple physical contacts correspond to a tap pattern (block 515). In one embodiment, tap detector 405 may determine whether the one or multiple physical contacts correspond to a tap pattern. Tap detector 405 may compare physical contact information output from sensor 325 with information stored in database 410. This information may include, for example, the number of physical contacts, the location and/or the direction of the one or multiple physical contacts with respect to device 102-1, a time duration between a physical contact and a subsequent physical contact, the force associated with the physical contact, and/or the orientation of device 102-1 when the physical contact occurred.

When it is determined that the one or more multiple physical contacts do not correspond to a tap pattern (block 515—NO), process 500 may return to block 505. For example, sensor 325 may monitor for device-to-device physical contact(s). To avoid confusion, it will be appreciated that sensor 325 may be continuously monitoring for device-to-device physical contact(s) during the entire process 500.

When it is determined that the one or multiple physical contacts correspond to a tap pattern (block 515—YES), then discovery of the other device may be initiated (block 520). Tap-enabled application 415 may initiate a discovery phase to locate other device 102-2. For example, tap-enabled application 415 may transmit a discovery request 108 via communication interface 320. As previously described, discovery request 108 may be transmitted so that a device only in close proximity to device 102-1 may respond to discovery request 108. In one embodiment, the transmission range of discovery request 108 may be limited to, for example, two meters or less. In another embodiment, the transmission range of discovery request 108 may be limited to a closer range, for example, one meter or less.

A communication link may be established with the other device based on the discovery of the other device (block 525). For example, assuming device 102-1 receives discovery response 110 from other device 102-2. Tap-enabled application 415 may establish communication link 112 with other device 102-2 via communication interface 320. In one embodiment, communication link 112 may correspond to a direct link between device 102-1 and device 102-2. In another embodiment, communication link 112 may correspond to an indirect link (e.g., an intermediary node, a network, etc.) between device 102-1 and device 102-2.

Information may be transmitted to or may interact with the other device utilizing the communication link (block 530). Tap-enabled application 415 may initiate an execution phase. In one embodiment, tap-enabled application 415 may select the appropriate execution phase based on the tap pattern information (e.g., the meaning associated with the tap pattern). In another embodiment, tap-enabled application 415 may select the appropriate execution phase based on a context-dependent scheme, as previously described.

As previously described, the execution phase may involve various types of operations. For example, tap-enabled application 415 may transmit information to or interact with other device 102-2 utilizing communication link 112. As previously described, the transmitted information may correspond to an image, music, text, a video, an electronic payment, a coupon, contact information, or some other type of data. Alternatively, device 102-1 and other device 102-2 may involve an interaction between these devices.

Although FIG. 5 illustrates an exemplary process 500, in other implementations, process 500 may include fewer, different, and/or additional operations than those described. For example, tap detector 405 may determine that a tap occurred, without necessarily identifying a specific tap pattern. As previously described, database 410 may include different tap patterns (e.g., three taps versus two taps, or two taps associated with one location versus one tap associated with another location, or various other types of combinations of tap pattern information). However, in another embodiment, tap detector 405 may recognize that a tap or tap(s) occurred based on the physical contact information satisfying a particular tap criterion (e.g., a number of taps). In this way, tap detector 405 may recognize (in a general sense) that a tap occurred, without identifying a specific tap pattern. Although, process 500 has been described with respect to device 102-1 and device 102-2, in other implementations, process 500 may involve more than two devices.

EXAMPLES

FIGS. 6A-6C and 7A-7C illustrate exemplary processes relating to the interaction and/or transference of information based on device-to-device physical contact. These examples are consistent with the exemplary process described above with respect to FIG. 5.

Figure 6A:
FIGS. 6A-6C and 7A-7C are diagrams illustrating exemplary scenarios relating to communication between devices based on device-to-device physical contact.
Figure 6B:
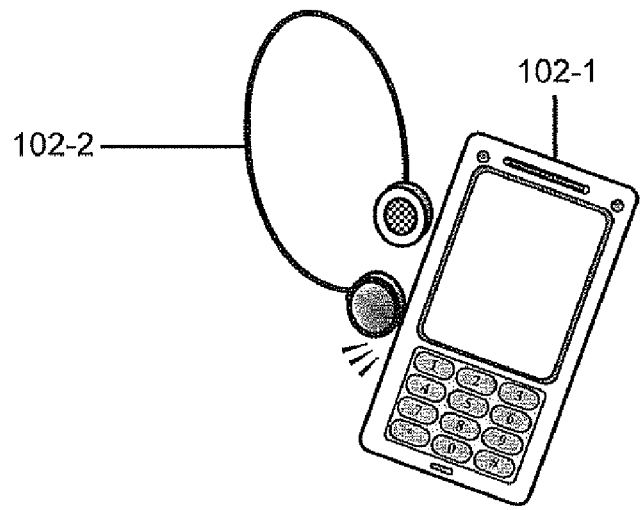
Figure 6C:
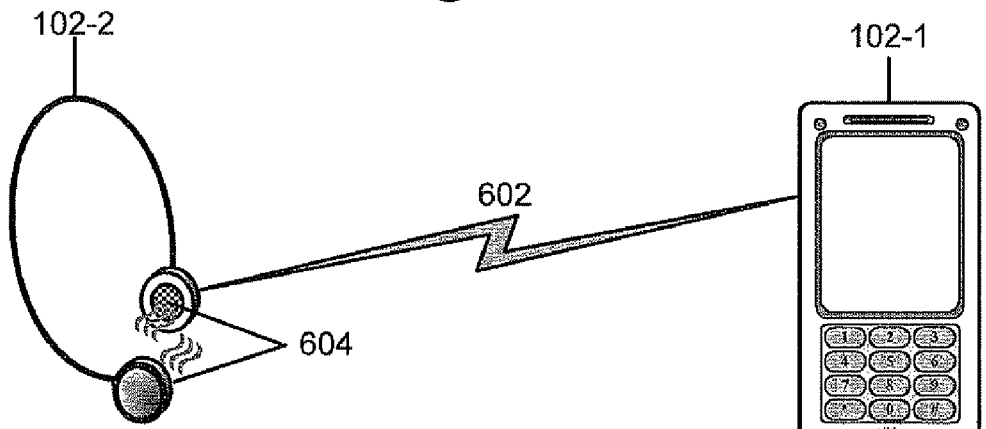

FIGS. 6A-6C illustrate an example in which device 102-1 selects a peripheral for an audio output. In FIG. 6A, assume a user is watching a video on device 102-1, but prefers to listen to the audio on other device 102-2 (e.g., a headset device). As illustrated in FIG. 6B, the user may tap device 102-1 to other device 102-2. Device 102-1 may recognize that a tap(s) occurred based on sensor 325 and tap detector 405. As illustrated in FIG. 6C, tap-enabled application 415 of device 102-1 may establish a communication link 602. Based on the context-dependent scheme, tap-enabled application 415 may recognize to send the audio portion of the video to other device 102-2. Thereafter, the user may hear the audio portion of the video through speakers 604 of other device 102-2.

Figure 7A:
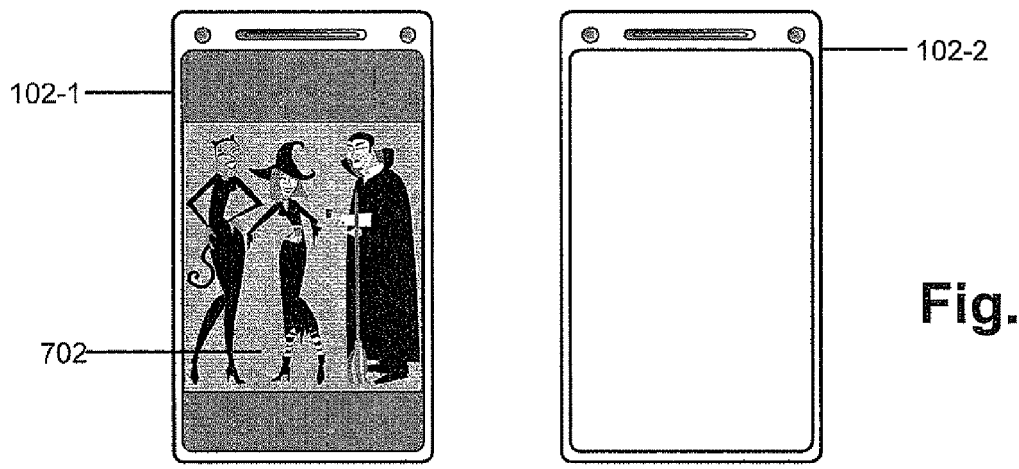
Figure 7B:
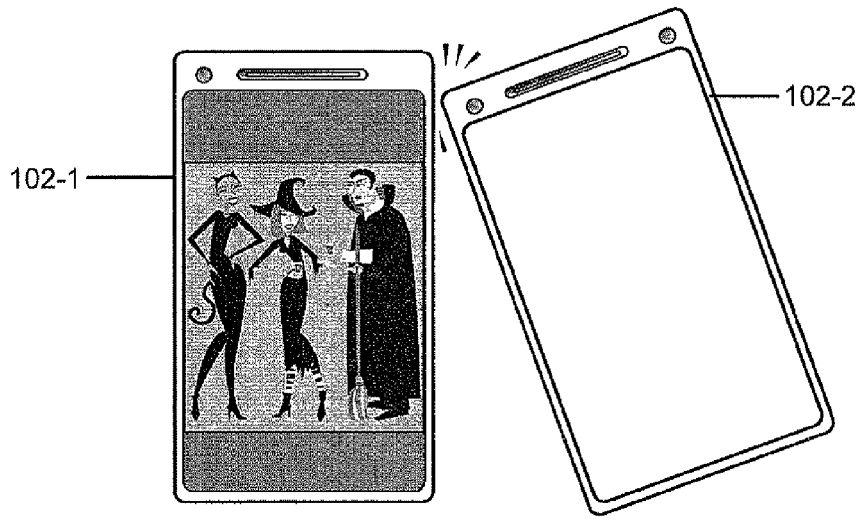
Figure 7C:
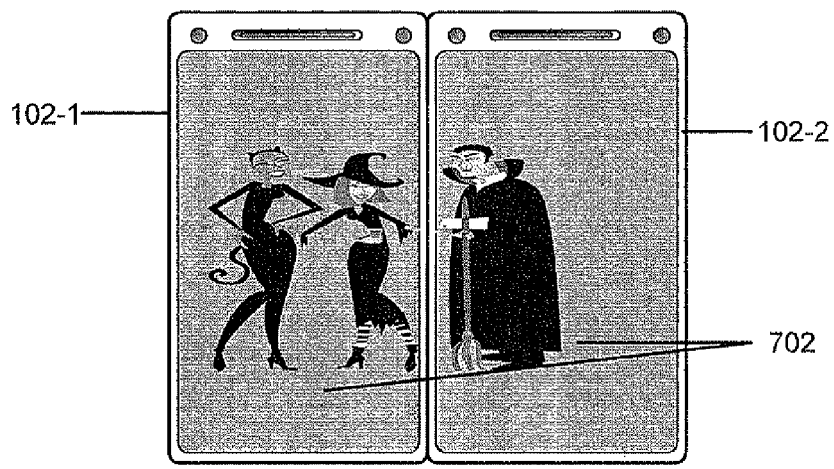

FIGS. 7A-7C illustrate an exemplary process in which device 102-1 and device 102-2 display information. As illustrated in FIG. 7A, device 102-1 may be displaying a picture 702. However, the user may wish to display picture 702 in a distributed fashion (i.e., a portion of picture 702 on device 102-1 and a portion of picture 702 on other device 102-2). User may tap device 102-1 with other device 102-2, as illustrated in FIG. 7B. Device 102-1 may recognize that a tap(s) occurred based on sensor 325 and tap detector 405. As illustrated in FIG. 7C, tap-enabled application 415 of device 102-1 may establish a communication link. Based on the context-dependent scheme and the direction of the tap (i.e., tap pattern information), picture 702 may be displayed on devices 102-1 and 102-2 in a distributed manner, as illustrated in FIG. 7C. In this example, the direction of the tap may influence the execution phase (e.g., to distribute picture 702 on multiple displays). In another example, the direction of the tap may influence the execution phase with respect to, for example, scrolling picture 702, in one direction versus another direction based on the direction of the tap. For example, picture 702 may scroll from the right of device 102-2 when the direction of the tap is in one direction and scroll from the left of device 102-2 when the direction of the tap is in another direction.

In addition, other types of tap-based interaction may occur. For example, a user could obtain songs or movies from a kiosk by tapping the kiosk.

CONCLUSION

The foregoing description of implementations provides illustration, but is not intended to be exhaustive or to limit the implementations to the precise form disclosed. Modifications and variations are possible in light of the above teachings or may be acquired from practice of the teachings.

It should be emphasized that the term "comprises" or "comprising" when used in the specification is taken to specify the presence of stated features, integers, steps, or components but does not preclude the presence or addition of one or more other features, integers, steps, components, or groups thereof.

In addition, while a series of blocks has been described with regard to the process illustrated in FIG. 5, the order of the blocks may be modified in other implementations. Further, non-dependent blocks may be performed in parallel. Further one or more blocks may be omitted.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" and "an" are intended to include one or more items. Where only one item is intended, the term "one" or similar language is used. Further, the phrase "based on" is intended to mean "based, at least in part, on" unless explicitly stated otherwise. As used herein, the term "and/or" includes any and all combinations of one or more of the associated list items.

What is claimed is:

1. A method, comprising:
   detecting, by a first device, one or more physical contacts between the first device and a second device;
   determining, by the first device, whether the one or more physical contacts corresponds to one of a plurality of taps, wherein the first device makes the determination without further communication with or input from the second device;
   initiating, by the first device, a discovery request to the second device, when it is determined that the physical contact corresponds to one of the plurality of taps;
   determining an action corresponding to the detected tap; and
   communicating, by the first device, to the second device based on the determined action, after a communication link is established between the first device and the second device based on the discovery request.

2. The method of claim 1, further comprising:
   receiving, by the first device, a discovery response from the second device.

3. The method of claim 1, where the initiating comprises:
   transmitting, by the first device, the discovery request at a power level that permits the second device to receive the discovery request only if the second device is at a distance of two meters or less from the first device.

4. The method of claim 1, where the determining comprises:
 determining, by the first device, whether a tapping pattern exists based on one or more of a number of the one or more physical contacts detected, a location in which the one or more physical contacts occurred, a force associated with the one or more physical contacts, or a time duration in which the one or more physical contacts occurred.

5. The method of claim 1, where the communicating comprises:
 transmitting, by the first device, data to the second device.

6. The method of claim 5, where the transmitting comprises: selecting, by the first device, a file to transmit based on a determination of which file the first device is currently utilizing.

7. The method of claim 1, where the communicating comprises:
 coordinating, by the first device, at least one of an audio task or a visual task with the second device.

8. The method of claim 7, where the coordinating comprises:
 identifying, by the first device, a particular audio task or a particular visual task based on a tapping pattern associated with the one or more taps.

9. A user device to:
 monitor for an occurrence of one or more device-to-device physical contacts associated with the user device and a second device;
 determine whether one of a plurality of taps occurred based on the occurrence of the one or more device-to-device physical contacts, wherein the user device makes the determination without further communication with or input from the second device;
 establish a communication link with the other device, when it is determined that one of the plurality of taps occurred;
 determine an action corresponding to the determined tap; and
 communicate with the second device based on the determined action, after the communication link is established.

10. The user device of claim 9, where the user device is further to:
 determine whether the one or more taps correspond to a tapping pattern; and
 where, when communicating, the user device is further to:
  perform at least one of an audio task or a visual task in correspondence to the tapping pattern, when it is determined that the one or more taps correspond to the tapping pattern.

11. The user device of claim 9, where the user device includes a wireless communication device.

12. The user device of claim 9, where, when determining whether one or more taps occurred, the user device is further to:
 identify at least one of a number of the one or more device-to-device physical contacts, a force associated with each of the one or more device-to-device physical contacts, a direction associated with each of the one or more device-to-device physical contacts, or a time duration between one of the one or more device-to-device physical contacts and a subsequent one of the one or more device-to-device physical contacts.

13. The user device of claim 9, where, when establishing the communication link, the user device is further to:
 regulate a transmission power associated with a discovery phase so that the second device to receive a discovery request is capable of responding only if the second device is at a distance of two meters or less from the user device.

14. The user device of claim 9, where, when establishing the communication link, the user device is further to:
 initiate a dialogue with the second device to inform the second device of a task to which the second device is to perform once the communication link is established.

15. The user device of claim 9, where, when communicating, the user device is further to:
 transmit data in which the user device is utilizing, where the data includes one of audio data, video data, image data, or text.

16. The user device of claim 9, where, when communicating, the user device is further to:
 utilize Bluetooth profiles.

17. The user device of claim 9, where, when communicating, the user device is further to:
 provide that an image displayed on the user device is also displayed on the second device.

18. A computer-readable medium containing instructions executable by at least one processor, the computer-readable medium storing instructions for:
 determining whether a first device has tapped a second device based on sensor information, wherein the first device makes the determination without further communication with or input from the second device;
 initiating a discovery phase to establish a communication link with the second device to which the first device was tapped, when it is determined that the first device has tapped the second device;
 determining an action corresponding to the determined tap; and
 communicating with the second device based on the determined action, after the communication link with the second device is established.

19. The computer-readable medium of claim 18, where the computer-readable medium resides on a portable device.

20. The computer-readable medium of claim 18, where the instructions for communicating further comprise:
 one or more instructions for interacting with the second device, where the interacting includes transmitting data to the second device.

* * * * *